Figure 1:
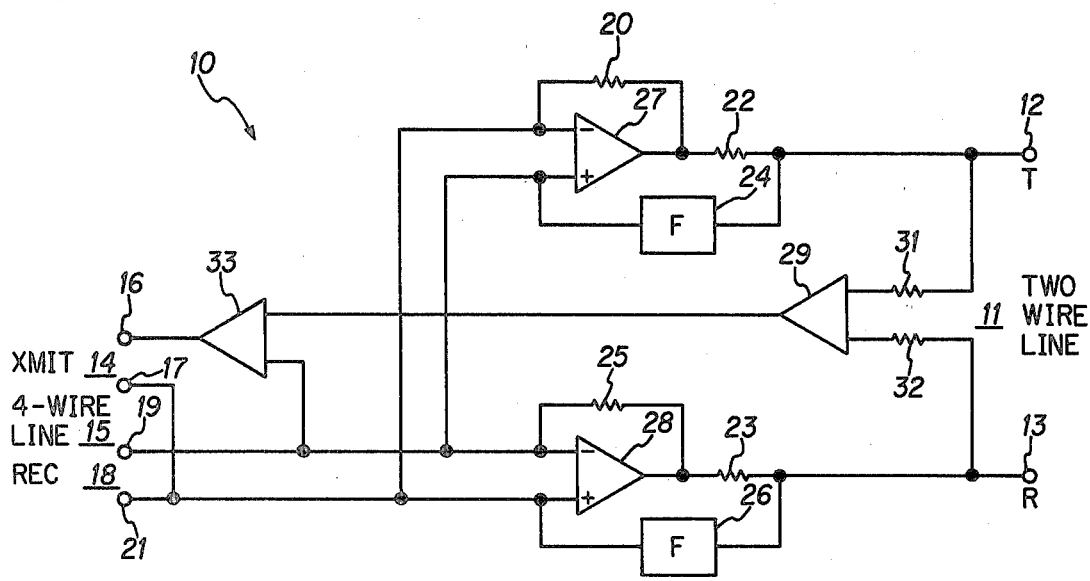

United States Patent [19]

Regan

[11] 4,388,500
[45] Jun. 14, 1983

[54] ELECTRONIC HYBRID

[75] Inventor: John F. Regan, Lombard, Ill.

[73] Assignee: Wescom, Inc., Downers Grove, Ill.

[21] Appl. No.: 239,061

[22] Filed: Feb. 27, 1981

[51] Int. Cl.³ .............................................. H04B 1/58
[52] U.S. Cl. ............................. 179/170 NC; 179/77; 179/170 T
[58] Field of Search ........ 179/170 R, 170 NC, 170 T, 179/16 F

[56] References Cited

U.S. PATENT DOCUMENTS

| 4,041,252 | 8/1977 | Cowden | 179/170 NC |
| 4,053,722 | 10/1977 | Nahay | 179/170 NC |
| 4,064,377 | 12/1977 | Regan | 179/170 NC |
| 4,314,106 | 2/1982 | Bakker | 179/16 F |

Primary Examiner—G. Z. Rubinson
Assistant Examiner—Randall P. Myers
Attorney, Agent, or Firm—C. B. Patti; H. R. Greenberg; R. Frederick Hamann

[57] ABSTRACT

An improved electronic hybrid for coupling signals between two wire and four wire transmission circuits. The hybrid includes a pair of amplifiers associated with a pair of terminating impedances which are serially connected between the amplifier outputs and the two wire port. The amplifiers driving the two wire port through the terminating impedances are biased to couple a dc potential to the two wire line whereby the terminating impedances serve as battery feed resistors. Each amplifier-impedance arrangement includes a feedback circuit connected from the junction between the impedance and the two wire port and an input of the amplifier for providing positive feedback for the amplifier so that the output impedance of the hybrid is maintained at a desired level using battery feed resistors of smaller value than heretofore required. The result is the ability to drive longer loops through the smaller series impedances while at the same time exhibiting the desired terminating impedance.

9 Claims, 2 Drawing Figures

ELECTRONIC HYBRID

DESCRIPTION OF THE INVENTION

This invention relates to hybrid circuitry for coupling signals between two wire and four wire transmission circuits and more particularly concerns an electronic hybrid circuit of the type which provides dc current for the two wire line.

Hybrid circuits are used in communications networks where it is necessary to couple a bidirectional two wire line to individual unidirectional sections of a four wire line. In telephony, for example, bidirectional signals may be carried over a two wire line, such as in a subscriber loop, but must be split into separate transmit and receive unidirectional signals, such as for a central office. The most recent general form of such hybrid circuits has been a transformerless or electronic hybrid. A particularly useful electronic hybrid has been described in U.S. Pat. No. 4,064,377. The hybrid circuit described therein provides an electronic hybrid capable of meeting the operating requirements of practical telecommunications systems. Among the features of that hybrid are precisely matched terminating impedances interposed in series between the circuity driving the two wire line and the two wire line itself, said impedances being arranged to transform all voltages in the two wire loop, whether normal or abnormal, to currents of manageable proportions.

The above-mentioned hybrid has excellent longitudinal balance and also uses its terminating impedances to serve as battery feed resistors. That is, all of the two wire line loop current flows through the terminating impedances.

Causing loop current to pass through the same terminating impedances as are provided for matching the line impedance imposes one limitation on the use of the hybrid circuit. In a typical subscriber loop, the nominal line impedance to be matched by the terminating impedances of the hybrid totals 600 ohms. A basic telephone requirement is to provide a minimum of 23 milliamps loop current to subscriber loops. Considering a 48 volt dc supply with about 10 volts allowed for signal swing, there is a maximum possible dc loop resistance of about 1,650 ohms. By using 600 ohms for the hybrid terminating resistors in the path of all dc line current, the maximum external subscriber loop resistance cannot be much larger than about 1,000 ohms. It is desirable for long loop operation to be able to handle about 1500 ohms.

It is therefore an object of the present invention to provide a hybrid circuit with series connected battery feed resistors in which a desired terminating impedance is achieved by multiplying the effect of the battery feed resistors so that the actual value thereof can be reduced to provide increased loop driving capability.

It is a further object of the invention to provide such a hybrid circuit which has a wider dynamic range of operation due to a reduced amplifier series impedance.

It is a subsidiary object of the invention to provide such a hybrid circuit which is less sensitive to low frequency longitudinals.

Figure 2:
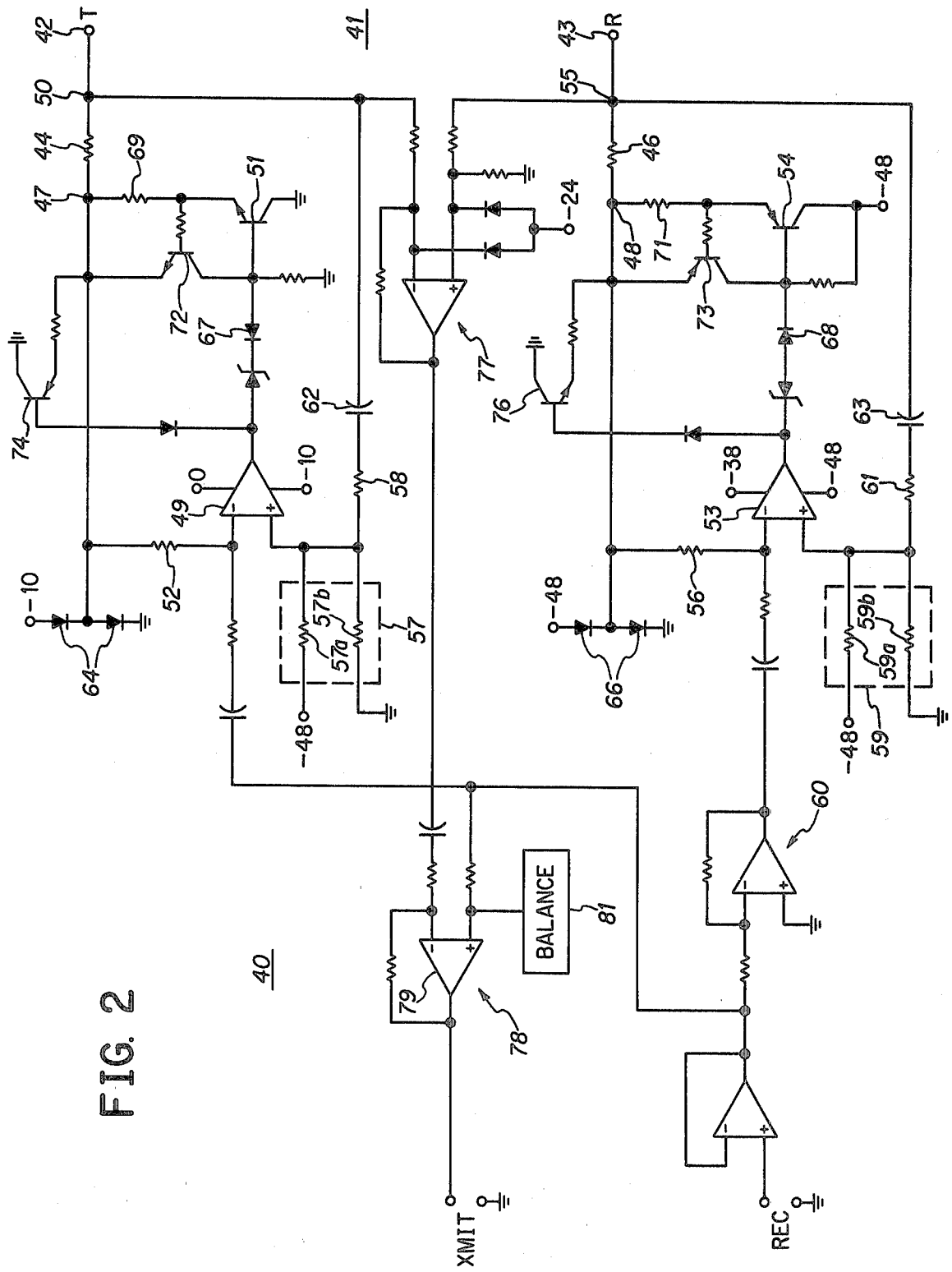

Other objects and advantages of the invention will become apparent upon reading the following detailed description and upon reference to the drawings, in which:

FIG. 1 is a simplified functional diagram illustrating the major components of a hybrid exemplifying the present invention; and FIG. 2 is a schematic diagram illustrating one form of hybrid constructed in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

A simplified functional diagram illustrating the major components of a hybrid exemplifying the present invention is shown in FIG. 1. The hybrid 10 is adapted to couple signals between a two wire bidirectional line and a pair of unidirectional lines in a four wire circuit, and includes a two wire port 11 having terminals 12, 13 for connection to a two wire line. The hybrid 10 further includes a transmit port 14 having terminals 16, 17 for connection to the transmit circuitry of a four wire line and a receive port 18 having terminals 19, 21 for connection to the receive circuitry of the four wire line. The transmit port 14 and the receive port 18 together comprise a four wire port 15. The illustrated two wire terminals 12, 13 are connected directly to the two wire line without the need for transformers or other magnetic elements.

A pair of impedances 22, 23 are serially coupled between the terminals 12, 13 of the two wire port and the circuitry of the hybrid in such a way that the impedances 22, 23 function as battery feed resistors for the hybrid. Ignoring for the moment the feedback circuits 24, 26 illustrated diagrammatically, the impedances 22, 23 serve as terminating impedances for the two wire line with the circuitry of the hybrid connected to the terminating impedances providing ac ground points for each impedance at these connections. A pair of operational amplifiers 27, 28 are connected to the respective terminating impedances for driving the two wire line through the impedances. The amplifiers are arranged such that their outputs are an effective ac ground as described, for example, in U.S. Pat. No. 4,064,377, by provision of feedback resistors 20, 25 with the point of feedback establishing the ac ground.

The magnitudes of the impedances viewed from each of the terminals 12, 13 looking into the hybrid 10 must be precisely matched in order to provide the required longitudinal balance and in combination must match the nominal impedance of the equipment coupled thereto at the two wire port 11. A discussion of longitudinal balance and impedance matching for hybrid circuits such as is functionally shown in FIG. 1 may be found in the above-mentioned U.S. patent.

In the hybrid of FIG. 1 it is further desired to provide battery feed to the two wire line from the hybrid 10. The amplifiers 27, 28 which produce the ac ground are biased to establish their quiescent operating points at separated dc levels so that the amplifiers themselves produce the dc loop currents. The impedances 22, 23 serve as battery feed resistors.

In a typical subscriber loop application, the terminal 12 is connected to the tip conductor and the terminal 13 to the ring conductor of the loop. Typically, subscriber loops are driven by a battery potential of approximately −48 volts with respect to ground. To power such a line from the illustrated hybrid and allowing for signal swing, the amplifier 27 may be biased at −5 volts and the amplifier 28 at −43 volts. Although in the absence of the feedback circuits 24, 26, and as discussed in the above mentioned 4,064,377 patent, the amplifier 27 may be replaced with a ground with all of the bias being provided through the amplifier 28, in the present instance it is preferred to use both of the amplifiers 27, 28.

As schematically illustrated in FIG. 1 the receive port 18 is coupled to the amplifiers 27, 28 for driving the two wire line in response to signals imposed upon the receive port. It will be appreciated that the amplifiers 27 and 28 must be configured to respond 180° out of phase with respect to each other so as to provide differential ac drive to the two wire line.

For coupling signals received at the two wire port 11 to the transmit port 14, means are provided for recovering information signals imposed on the two wire port while rejecting noninformation-bearing longitudinal signals. To that end, an amplifier 29 has its inputs differentially coupled to thThe values of the resistors 31, 32 are precisely matched and are several orders of magnitude larger than the values of the resistors 22, 23. As a result, the impedance of the reverse signal recovery circuitry has a negligible effect upon the longitudinal balance of the hybrid. Because the amplifier 29 is differentially coupled to the two wire line, it will ignore in-phase signals and thereby provide excellent longitudinal rejection. The output of the amplifier 29 is coupled to one of the inputs of an amplifier 33 having its output in turn driving the transmit port 14 of the four wire line. As a result, signal currents detected by the amplifier 29 are coupled to the amplifier 33 and thereby to the transmit port.

Cancellation means are provided for preventing signals imposed on the receive port, coupled to the two wire line, and thereafter detected by the amplifier 29 from being returned to the transmit port. To that end, the terminal 19 of the receive port is coupled to a second input of the amplifier 33, the amplification being adjusted so that a signal imposed on the receive port will completely cancel the response of the amplifier 29 to the effect of that signal coupled to the two wire line.

Further discussion of the signal recovery function of the amplifier 29 and its related circuitry, as well as the use of the amplifier in a supervisory capacity, may be found in the above-identified U.S. patent.

In accordance with the invention, feedback circuits 24, 26 are provided for maintaining the desired output impedance of the hybrid 10 as presented to the two wire line while reducing the contribution of the hybrid circuitry to the dc battery feed loop resistance. To accomplish this, positive feedback is provided around each of the amplifier and battery feed impedance arrangements, so that the output impedance presented at the two wire port 11 is maintained, such as at 600 ohms for a subscriber loop, while the magnitude of the battery feed impedances 22 and 23 can be reduced. The positive feedback increases the ac impedance looking into the hybrid at frequencies of interest to maintain the required output impedance match with the two wire line, while allowing a reduction in the value of the impedance through which the dc loop current passes. Accordingly, it is possible to drive a subscriber loop wherein virtually all of the dc resistance is contained in the subscriber loop with very little resistance contributed by the hybrid. At the same time, with the amplifier series impedances smaller, the amplifier dynamic operating ranges are wider because a smaller voltage swing at each amplifier output is required to drive the two wire line. As an example, it is possible to reduce the magnitude of the battery feed resistors to 100 ohms each, substantially increasing the long loop capability of the hybrid while at the same time configuring feedback circuits 24, 26 to produce feedback over the frequencies of interest to effectively multiply the value of the battery feed resistors to achieve in the example a 600 ohm terminating impedance.

Turning now to FIG. 2, there is illustrated the circuitry of a hybrid constructed in accordance with the invention. The hybrid 40 is coupled to a two wire port 41 including a terminal 42 for a tip line and a terminal 43 for a ring line. Matched battery feed impedances, resistors 44, 46 are interposed in series between the terminals 42, 43 and the circuitry driving the two wire line. The resistor 44 is coupled in series between the terminal 42 and a junction 47 which is maintained at ac ground. Similarly, the resistor 46 is interposed between the terminal 43 and a junction 48 which is also maintained at ac ground.

The ac ground 47 is produced by amplification circuitry including a feedback amplifier 49 having a transistor 51 coupled in emitter follower configuration between ground and the point 47, with negative feedback from the ac ground point 47 to the inverting input of the amplifier 49 being provided by a resistor 52. The ac ground at the junction 48 is provided by amplification circuitry including a feedback amplifier 53 having a transistor 54 coupled in the output circuit thereof in emitter follower configuration between a −48 volt bus and the point 48. Feedback from the point 48 to the inverting input of the amplifier 53 is provided by a resistor 56. It is apparent from the circuit as thus far described that the junctions 47, 48 serving as the feedback junctions for the amplifier circuitry provide ac ground points and thereby establish the battery feed impedances 44, 46 as the sole terminating impedances looking into the hybrid from the port 41.

In accordance with the invention, the values of the battery feed resistors are reduced to levels considerably smaller than heretofore used and feedback means are provided for multiplying the effect of those values to maintain the output impedance of the hybrid at the desired level. In order to accomplish that, a positive feedback circuit is connected from a point 50 on the side of the resistor 44 which is coupled to the tip terminal 42, to the noninverting input of the amplifier 49; and a positive feedback circuit is connected from a point 55 on the side of the resistor 46 coupled to the ring terminal 43 to the noninverting input of the amplifier 53. The structure of those feedback circuits will be further described below.

At the outset, it should be noted that the dc operating point of the tip terminal 42 is determined by the resistance ratio of resistors 57a and 57b. The junction of this dc voltage divider is connected to the amplifier's 49 noninverting input to establish a bias thereon. The parallel combination of 57a and 57b form a composite resistance 57 whose significance will be discussed later. A similar reasoning may be applied to resistors 59a and 59b in assessing their function in connection with amplifier 53 and the associated ring terminal 43.

The level of positive feedback for the amplifier 49 is determined by a resistative divider connected from the point 50 comprising resistor combination 57 and a resistor 58. The voltage across the resistor 57b is fed back to the non-inverting input of the amplifier 49 to provide the desired positive feedback. The positive feedback for the amplifier 53 is provided by a voltage divider comprising resistor combination 59 and a resistor 61 connected from the point 55. The voltage across the resistor 59b is connected to the non-inverting input of the amplifier 53 to provide the desired positive feedback. Each feedback path also includes a capacitor 62, 63 to provide roll off for the output impedance of the hybrid so that at dc the battery feed voltage is not fed back to produce a large amplifier voltage drop.

With the positive feedback, the terminating impedance looking into the two wire port 41 is the sum of the impedances 44, 46 to each of their respective ac grounds, as increased by the feedback taken from the points 50, 55. The value of the dc battery feed resistance remains the sum of the impedances 44, 46. For example, a nominal 600 ohm subscriber loop, calling for a hybrid output impedance of a matching 600 ohms, the dc loop impedance contributed by the hybrid may be reduced to 200 ohms, the impedances 44 and 46 being 100 ohms each, by setting the gain of the amplifiers 49, 53, due to the positive feedback, at three over the frequency range of interest. In one such instance, the resistor combinations 57, 59 are each 10,000 ohms and the resistors 58, 61 are each 20,000 ohms. Since the gain of each amplifier due the positive feedback is one plus the quotient of the resistor 58 or 61 divided by the value of the resistor combinations 57 or 59, respectively, the gain is 3. Therefore, the impedance looking into each terminal 42, 43 toward ac ground 47, 48 is three times the 100 ohms of the battery feed resistance 44, 46 giving an effective impedance at each terminal of 300 ohms, and an effective terminating impedance of the hybrid 40 of 600 ohms, matching the impedance of the subscriber loop. Meanwhile, with the battery feed impedances 44, 46 reduced to 100 ohms each, the contribution of the hybrid to the maximum allowable 1,650 ohms driven by the battery feed voltage is now 200 ohms, rather than 600 ohms, so that the dc resistance of the loop may be increased from about 1,000 ohms to about 1400 ohms. The increased dc resistance allowable in the loop enables the use of a longer subscriber loop for a given hybrid circuit 40. Clearly other, smaller, values for the impedances 44, 46 may be selected so that there is even less loss in the battery feed from the hybrid 40. For example, if the resistors 44, 46 are 50 ohms each, the positive feedback for each amplifier 49, 53 is increased to a gain of 6, maintaining the 600 ohm output impedance of the hybrid, while the dc resistance for the battery feed is reduced to 100 ohms.

The capacitors 62, 63 in the positive feedback circuits are selected so that the frequency roll off of the positive feedback is established at about 180 hz, below which frequency the terminating impedance of the hybrid as seen from the two wire port 41 decreases below the characteristic 600 ohms. Introduction of the capacitors 62, 63 eliminates the large voltage drops which would otherwise occur across the amplifiers 49, 53 at dc. This reduction is also advantageous because a lower terminating impedance is therefore presented to the majority of longitudinals which typically are at about 60 hertz. The normal frequency range for operation of a hybrid is generally between about 300 and about 3,000 hertz.

The protection circuits associated with the hybrid 40 are similar to those disclosed in the above mentioned U.S. Pat. No. 4,064,377 and will be noted only briefly. The ac ground points 47, 48 are each provided with appropriately poled clamping diodes for protecting the circuitry from excessive voltages, such diodes being indicated generally at 64, 66. Diodes 67, 68 are coupled in the output circuitry of the amplifiers 49, 53, respectively, so as to become reverse biased during short circuit conditions on the line, maintaining the associated amplifiers within their dynamic operating ranges. Current sensing resistors 69, 71 are connected in series with the emitter follower transistors 51, 54 and in the base circuit of clamping transistors 72, 73 so that when current flow through the sensing resistors is sufficient to forward bias the base-emitter junction of the associated transistor, the transistor will conduct, clamping the output of the associated driving amplifier to limit current in the loop. The transistors 74, 76 and their associated circuitry are provided to maintain current flow through the terminating impedances, to maintain longitudinal balance, when longitudinal currents attempt to override the quiescent current provided by the hybrid. A phase inverter circuit 60 is interposed between the receive port of the hybrid and the amplifier 53 so that the amplifier 49, 53 are driven out of phase to differentially drive the two wire port 41.

Reverse signal recovery is provided by an amplifier circuit designated generally as 77 which also supervises the loop coupled to the port 41. The signals recovered from the two wire line are coupled from the output of the amplifier circuit 77 through an amplifier circuit 78 to the transmit terminals of the four wire port. The other input to the amplifier 79 is provided from the receive terminal of the four wire port in order to cancel the transmission of signals on the two wire line from the receive terminals of the four wire port. A precision balance network 81, which can be a gyrator, is also coupled to the noninverting input of the amplifier 79 to present a frequency dependent impedance to signals from the receive port which approximates the impedance characteristic of the line presented to the two wire port so that cancellation will occur across the frequency band. Further, more detailed, discussion of the recovery circuit 77, the amplifier and cancellation circuit 78 and the balance circuit 81 may be found in the above-mentioned U.S. patent.

The two amplifier dc loop current drive shown in FIG. 2 is preferred in the practice of the present invention in order to most easily eliminate longitundinal problems and provide a balanced terminating impedance at all frequencies. In an unbalanced system, such as where all of the dc drive is provided by the amplifier 53, with the amplifier 49 circuitry being substantially replaced by a ground connection, it would be necessary to connect a complex impedance on the tip line terminal 42, that would track the amplifier characteristics on the ring line. It is not overly difficult using thick film technnology to precisely match the characteristics of the amplifiers so that even though the terminating impedance decreases below the roll off frequency, the impedance in the tip and ring line track precisely so that longitudinals will not prove troublesome.

It can be seen that a hybrid has been described herein having series connected battery feed resistors in which a desired terminating impedance is achieved by multiplying the effect of the battery feed resistors so that the actual values thereof can be reduced, providing increased loop driving capability. It can be further seen that such a hybrid circuit has been described which has a wider dynamic range of operation due to a reduced amplifier series impedance. Further, such a hybrid has been described which is less sensitive to low frequency longitudinals.

What is claimed is:

1. In an electronic hybrid having a two wire port for coupling to a two wire line, separate transmit and receive ports for coupling to a four wire line, driving means responsive to signals imposed on the receive port for driving the two wire line including a pair of amplifiers each having an input responsive to signals imposed on said receive port and an output, means responsive to signals imposed on the two wire port for transmitting said signals to the transmit port, means for preventing signals imposed on the receive port and coupled to the two wire port from being returned to the transmit port, an impedance serially connected between each amplifier output and the two wire port, the driving means including means for providing an ac ground at the junction between each amplifier output and its associated impedance and the driving means being biased to supply dc current to the two wire line through the impedances, the improvement comprising said serially connected impedances having an aggregate value of less than half of the desired terminating impedance of the hybrid, and feedback means connected from the junction between each impedance and the two wire port to an input of each amplifier for providing positive feedback for each amplifier whereby the output impedance of the hybrid attributable to the aggregate of the serially connected impedances increased.

2. The improvement of claim 1 in which the impedance is a resistive impedance.

3. The improvement of claim 2 in which the feedback means comprises a resistor-capacitor series arrangement.

4. The improvement of claim 3 which further comprises an emitter-follower circuit interposed between the output of the amplifier and the impedance.

5. In an electronic hybrid having a two wire port for coupling to a two wire line, separate transmit and receive ports for coupling to a four wire line, driving means responsive to signals imposed on the receive port for driving the two wire line including a pair of amplifiers each having an input responsive to signals imposed on said receive port and having an output, means responsive to signals imposed on the two wire port for transmitting said signals to the transmit port, means for preventing signals imposed on the receive port and coupled to the two wire port from being returned to the transmit port, a pair of matched resistive impedances serially connected between the amplifier outputs and the two wire port so that an impedance is in series between an amplifier output and each line connected to said two wire port, and driving means including means for providing an ac ground at the junctions between the amplifier outputs and said impedances and said driving means being biased to supply dc current to the two wire line through said impedances, the improvement comprising said serially connected impedances having a combined value of less than the desired terminating impedance of the hybrid, and feedback means for providing positive feedback for each amplifier including a pair of feedback circuits each connected between a different one of the impedance/two wire port junctions and an input of the amplifier associated therewith, whereby the output impedance of the hybrid attributable to said serially connected impedances is increased.

6. The improvement of claim 5 in which each feedback circuit comprises a series connected resistor and capacitor.

7. The improvement of claim 6 in which there is interposed between the output of each amplifier and its associated said impedance an emitter follower circuit.

8. In an electronic hybrid having a two wire port for coupling to a two wire line, separate transmit and receive ports for coupling to a four wire line, driving means responsive to signals imposed on the receive port for driving the two wire line including a pair of amplifiers each having an input responsive to signals imposed on said receive port and having an output, means responsive to signals imposed on the two wire port for transmitting said signals to the transmit port, means for preventing signals imposed on the receive port and coupled to the two wire port from being returned to the transmit port, the improvement comprising:

(a) a pair of battery feed resistors serially connected between the amplifier outputs and the two wire port so that a resistor is in series between an amplifier output and each line connected to said two wire port, the battery feed resistors having magnitudes which together are less than the desired terminating impedance of the hybrid, said driving means including means for providing an ac ground at the junctions between the amplifier output and said resistors, and said driving means being biased to supply dc current to the two wire line through said resistors; and (b) a positive feedback circuit associated with each said amplifier coupled between a different one of the two wire ports and an input of an associated amplifier, the circuits providing positive feedback of sufficient magnitude to increase the amplifier gain to exhibit a hybrid output impedance which is a multiple greater than one of the battery feed resistance.

9. The improvement of claim 8 in which each said feedback circuit includes a series capacitor whereby the voltage drop across each amplifier is reduced at dc.

* * * * *